US012644014B2

(12) United States Patent (10) Patent No.: US 12,644,014 B2
Uehara et al. (45) Date of Patent: Jun. 2, 2026

(54) RUST-PREVENTIVE COMPOSITION AND AUTOMOBILE COMPONENT

(71) Applicants: Nihon Parkerizing Co., Ltd., Tokyo (JP); Toyota Jidosha Kabushiki Kaisha, Aichi (JP)

(72) Inventors: Yoshihiro Uehara, Tokyo (JP); Yuya Hasebe, Tokyo (JP); Yoshisuke Mimata, Tokyo (JP); Toshihisa Kataoka, Tokyo (JP); Takahisa Sudou, Toyota (JP); Masahiro Nakamura, Toyota (JP)

(73) Assignees: Nihon Parkerizing Co., Ltd., Tokyo (JP); Toyota Jidosha Kabushiki Kaisha, Aichi (JP)

( * ) Notice: Subject to any disclaimer, the term of this patent is extended or adjusted under 35 U.S.C. 154(b) by 976 days.

(21) Appl. No.: 17/795,015

(22) PCT Filed: Jan. 27, 2021

(86) PCT No.: PCT/JP2021/002798
§ 371 (c)(1),
(2) Date: Jan. 9, 2023

(87) PCT Pub. No.: WO2021/153601
PCT Pub. Date: Aug. 5, 2021

(65) Prior Publication Data
US 2023/0119174 A1 Apr. 20, 2023

(30) Foreign Application Priority Data
Jan. 31, 2020 (JP) ................................. 2020-014688

(51) Int. Cl.
| *C09D 191/06* | (2006.01) |
| *C09D 5/08* | (2006.01) |
| *C09D 7/20* | (2018.01) |
| *C09D 7/60* | (2018.01) |
| *C10N 30/12* | (2006.01) |

(52) U.S. Cl.
CPC .............. *C09D 191/06* (2013.01); *C09D 5/08* (2013.01); *C09D 7/20* (2018.01); *C09D 7/60* (2018.01); *C10M 2201/103* (2013.01); *C10M 2205/14* (2013.01); *C10N 2030/12* (2013.01)

(58) Field of Classification Search
CPC .......... C09D 191/06; C09D 5/08; C09D 7/20; C09D 7/60; C10M 2201/103; C10M 2205/14; C10M 169/044; C10M 2201/062; C10M 2203/1025; C10M 2205/022; C10M 2205/12; C10M 2207/28; C10M 2215/02; C10M 2219/044; C10M 2205/024; C10N 2030/12; C10N 2050/02; C10N 2060/02; C10N 2020/02; C10N 2010/04
See application file for complete search history.

(56) References Cited

U.S. PATENT DOCUMENTS

| 6,312,509 B1 | 11/2001 | Moradian |
| 8,921,290 B2 | 12/2014 | Lee et al. |
| 2006/0003904 A1 | 1/2006 | Maeda et al. |
| 2006/0047038 A1 | 3/2006 | Maeda et al. |
| 2015/0096463 A1 | 4/2015 | Shibata et al. |
| 2015/0361272 A1 | 12/2015 | Yoshida et al. |
| 2019/0300815 A1* | 10/2019 | Losch .................. C10M 129/10 |

FOREIGN PATENT DOCUMENTS

| CN | 102757847 A | | 10/2012 |
| CN | 102898846 B | | 6/2014 |
| CN | 103468353 B | | 3/2015 |
| CN | 105542490 A | | 5/2016 |
| EP | 1344801 A1 | | 9/2003 |
| JP | H7-118685 A | | 5/1995 |
| JP | 2003-268574 A | | 9/2003 |
| JP | 2006-16632 A | | 1/2006 |
| JP | 2006-070295 A | | 3/2006 |
| JP | 2007153962 A | * | 6/2007 |
| JP | 2013-199670 A | | 10/2013 |

(Continued)

OTHER PUBLICATIONS

JP-2014198864-A, machine translation (Year: 2014).*
JP-2007153962-A, machine translation (Year: 2007).*
JP-2018076565-A, machine translation (Year: 2018).*
Hongfa Zhu, A Handbook of Usual Crude Material for Fine Chemical Industry, Beijing Golden Shield Publishing House, 2003, pp. 222-223.
Rejection Decision issued in corresponding CN Application No. 202180011539.5 dated Mar. 29, 2025, 13 pages.
Extended European Search Report in EP Application No. 21747116.8 dagted May 16, 2023, 7 pages.
International Search Report in International Application No. PCT/JP2021-002798 dated Mar. 30, 2021, 3 pages.
Office Action in IN Application No. 202217046719 dated Oct. 7, 2025, 6 pages.

*Primary Examiner* — Marites A Guino-o Uzzle
(74) *Attorney, Agent, or Firm* — MARSHALL, GERSTEIN & BORUN LLP

(57) ABSTRACT

Provided is a rust-preventive composition showing excellent rust-preventive performance for plate joining parts such as doors of automotive bodies, the composition having sufficient corrosion resistance and being capable of preventing dripping from automotive bodies. A rust-preventive composition including: a rust-preventive additive; a wax having a melting point within the range of 60° C. to 130° C. selected from microcrystalline waxes and polyethylene-based or polypropylene-based synthetic waxes; bentonite; a hydrogenated oil; and two or more kinds of diluents having different viscosities; the rust-preventive additive being contained in an amount within the range of 12% by mass to 39% by mass with respect to the total composition, the bentonite being contained in an amount within the range of 2% by mass to 6% by mass with respect to the total composition, the wax being contained in an amount within the range of 3% by mass to 13% by mass with respect to the total composition.

3 Claims, No Drawings

(56)          References Cited

FOREIGN PATENT DOCUMENTS

| | | | | | |
|---|---|---|---|---|---|
| JP | 2014198864 | A | * | 10/2014 | |
| JP | 2016-014091 | A | | 1/2016 | |
| JP | 2018-76565 | A | | 5/2018 | |
| JP | 2018076565 | A | * | 5/2018 | .............. C23F 11/00 |
| WO | WO-2014/119678 | A1 | | 8/2014 | |

* cited by examiner

RUST-PREVENTIVE COMPOSITION AND AUTOMOBILE COMPONENT

TECHNICAL FIELD

The present invention relates to a rust-preventive composition. The present invention also relates to an automotive part having a rust-preventive film comprising the rust-preventive composition.

BACKGROUND ART

In automobiles, wax-type rust-preventive agents, which are compositions prepared by dissolving or dispersing a wax and various additives in a mineral spirit or another organic solvent, have been used for suspension components of automotive bodies, and for bag structures and plate joining parts of automotive bodies such as doors and hoods.

For example, Patent Document 1 discloses a rust-preventive composition comprising: a rust-preventive additive; a wax; a hydrogenated oil; and a diluent; the composition also comprising bentonite in an amount of 2 to 6% by mass with respect to the total composition.

Patent Document 2 discloses a rust-preventive composition comprising: a heat-polymerized drying oil; a wax; and/or a rust-preventive additive; which are dissolved or dispersed in a specific solvent.

PRIOR ART DOCUMENTS

Patent Documents

[Patent Document 1] JP 2014-198864 A
[Patent Document 2] JP 2006-16632 A

SUMMARY OF THE INVENTION

Problems to be Solved by the Invention

These conventional rust-preventive compositions still need to be improved regarding their rust-preventive performance especially for the plate joining parts. An object of the present invention is to provide a rust-preventive composition showing excellent rust-preventive performance for plate joining parts, the composition having sufficient corrosion resistance and being capable of preventing dripping from automotive bodies.

Means for Solving the Problems

As a result of study, the present inventors discovered that, by using two or more kinds of diluents having different viscosities, a rust-preventive composition showing excellent rust-preventive performance for plate joining parts, the composition having sufficient corrosion resistance and being capable of preventing dripping from automotive bodies, can be provided. More specifically, the present invention includes the following.

(1) A rust-preventive composition comprising: a rust-preventive additive; a wax having a melting point within the range of 60° C. to 130° C. selected from microcrystalline waxes and polyethylene-based or polypropylene-based synthetic waxes; bentonite; a hydrogenated oil; and two or more kinds of diluents having different viscosities; the rust-preventive additive being contained in an amount within the range of 12% by mass to 39% by mass with respect to the total composition, the bentonite being contained in an amount within the range of 2% by mass to 6% by mass with respect to the total composition, the wax being contained in an amount within the range of 3% by mass to 13% by mass with respect to the total composition.

(2) The rust-preventive composition according to (1), wherein the diluent having the lowest viscosity among the two or more kinds of diluents having different viscosities is contained in an amount within the range of 40% by mass to 80% by mass with respect to the total amount of diluents.

(3) The rust-preventive composition according to (1) or (2), wherein the diluent having the lowest viscosity among the two or more kinds of diluents having different viscosities has a kinematic viscosity within the range of 10 mm$^2$/s to 30 mm$^2$/s at 40° C.

(4) An automotive part having a rust-preventive film comprising the rust-preventive composition according to any one of (1) to (3).

Effect of the Invention

The rust-preventive composition of the present invention can provide a rust-preventive composition showing excellent rust-preventive performance for plate joining parts such as doors of automotive bodies, the composition having sufficient corrosion resistance and being capable of preventing dripping from automotive bodies. Further, an automotive part having a rust-preventive film comprising the rust-preventive composition can be provided.

MODE FOR CARRYING OUT THE INVENTION

The rust-preventive composition as one aspect of the present invention comprises: (A) a rust-preventive additive; (B) a wax having a melting point within the range of 60° C. to 130° C. selected from microcrystalline waxes and polyethylene-based or polypropylene-based synthetic waxes; (C) bentonite; (D) a hydrogenated oil; and (E) two or more kinds of diluents having different viscosities.

<(A) Rust-Preventive Additive>

The rust-preventive additive is not limited as long as a rust-preventive function can be imparted to the rust-preventive composition. Examples of the rust-preventive additive include sulfonates (such as alkyl benzene sulfonates, for example, calcium salt), carboxylates (amine carboxylates), amine salts, fatty acid esters, oxidized paraffin salts, and oxidized wax salts. Commercially available rust-preventive additives may also be used as they are. Although some rust-preventive additives are preliminarily diluted in an organic solvent, the amount of the volatile component is preferably as small as possible. Specific examples of such rust-preventive additives include oil-cut sulfonates, fatty acid esters, and oxidized paraffin salts. A single kind of rust-preventive additive may be used, or a mixture of two or more kinds of rust-preventive additives may be used.

The content of the rust-preventive additive is preferably within the range of 12% by mass to 39% by mass, more preferably within the range of 16% by mass to 35% by mass, with respect to the total rust-preventive composition.

<(B) Wax>

The wax is selected from microcrystalline waxes and polyethylene-based or polypropylene-based synthetic waxes. The melting point of the wax is not limited as long as it is within the range of 60° C. to 130° C. The melting point is preferably within the range of 80° C. to 120° C.

The synthetic waxes are not limited as long as they are polyethylene-based or polypropylene-based synthetic waxes. Examples of the synthetic waxes include Fischer- Tropsch waxes, polyethylene waxes, polypropylene waxes, and copolymers of ethylene and propylene. The polyethylene-based synthetic waxes means waxes containing a plurality of ethylene structures, and the polypropylene-based synthetic waxes means waxes containing a plurality of propylene structures. A single kind of wax may be used, or a mixture of two or more kinds of waxes may be used.

Natural waxes including vegetable-oil-based waxes such as candelilla wax, carnauba wax, rice wax, Japan wax, and jojoba wax; animal-based waxes such as beeswax, lanolin, and spermaceti; mineral-oil-based waxes such as montan wax, ozokerite, and ceresin; and petroleum waxes such as paraffin wax, microcrystalline wax, and petrolatum; may be used together with the microcrystalline waxes.

The wax content is preferably within the range of 3% by mass to 13% by mass, more preferably within the range of 3% by mass to 10% by mass, with respect to the total rust-preventive composition.

In cases where a synthetic wax is used, the content of the wax in the total rust-preventive composition may be reduced depending on the properties of the synthetic wax. For example, the content may be not more than 6% by mass or not more than 5% by mass with respect to the total rust-preventive composition.

<(C) Bentonite>

Bentonite is a mineral containing montmorillonite as a major component, wherein the montmorillonite has a layer structure in which plate crystals composed of aluminosilicate are layered on each other. The bentonite has a particle size of preferably within the range of 0.1 μm to 10 μm, more preferably within the range of 1 μm to 5 μm.

The content of the bentonite is preferably within the range of 2% by mass to 6% by mass, more preferably within the range of 3% by mass to 6% by mass, with respect to the total rust-preventive composition.

<(D) Hydrogenated Oil>

Examples of the hydrogenated oil include natural drying oils such as linseed oil, *perilla* oil, tung oil, hempseed oil, safflower oil, oiticica oil, sardine oil, herring oil, and castor oil; and synthetic drying oils such as dehydrated castor oil. The hydrogenated oil preferably has an iodine value of not less than 80. A single kind of hydrogenated oil may be used, or a mixture of two or more kinds of hydrogenated oils may be used.

The content of the hydrogenated oil is not limited, and is preferably within the range of 8% by mass to 25% by mass, more preferably within the range of 9% by mass to 15% by mass, with respect to the total rust-preventive composition.

<(E) Diluents>

The diluents are not limited as long as they can serve as base oils. Examples of the diluents include mineral oil-based lubricating oils, synthetic lubricating oils, liquid saturated hydrocarbon mixtures, vegetable oil-based semidrying oils, and vegetable oil-based non-drying oils. Specific examples of the diluents include mineral oil-based lubricating oils such as paraffin-based lubricating oils and naphthene-based lubricating oils; synthetic lubricating oils such as esters, polyalpha olefins, polyalkylene glycols, polybutenes, and alkyl diphenyl ethers; liquid saturated hydrocarbon mixtures such as liquid paraffins; vegetable oil-based semidrying oils such as soybean oil, cottonseed oil, rapeseed oil, rice oil, sesame oil, sunflower oil, and corn oil; and vegetable oil-based non-drying oils such as olive oil, peanut oil, and *camellia* oil. In the present aspect, a mixture of two or more kinds of diluents having different viscosities among these are used.

The content of the diluents is not limited, and is preferably within the range of 33% by mass to 60% by mass, more preferably within the range of 40% by mass to 57% by mass, with respect to the total rust-preventive composition.

The combination of the two or more kinds of diluents is not limited. The diluent having the lowest viscosity among the two or more kinds of diluents is preferably included in an amount within the range of 40% by mass to 80% by mass, more preferably included within the range of 50% by mass to 78% by mass with respect to the total amount of diluents.

The diluent having the lowest viscosity among the two or more kinds of diluents having different viscosities has a kinematic viscosity preferably within the range of 10 mm$^2$/s to 30 mm$^2$/s, more preferably within the range of 15 mm$^2$/s to 27 mm$^2$/s at 40° C. The diluent having the highest viscosity among the two or more kinds of diluents having different viscosities may have a kinematic viscosity of not less than 50 mm$^2$/s, preferably not less than 80 mm$^2$/s, more preferably not less than 100 mm$^2$/s at 40° C.

<Other Components>

The rust-preventive composition of the present aspect may also include a filler. Examples of the filler include calcium carbonate, kaolin clay, talc, mica, and various other conventionally known extender pigments. The content of the filler is not limited, and is preferably within the range of 5% by mass to 15% by mass, more preferably within the range of 6% by mass to 12% by mass, with respect to the total rust-preventive composition.

The rust-preventive composition according to the present aspect shows sufficient workability and rust-preventive performance for the floor back of automotive bodies, suspension components of automotive bodies, bag structures of automotive bodies, plate joining parts, and the like when the composition is applied by spraying or the like. In particular, the rust-preventive composition shows excellent rust-preventive performance in plate joining parts. Further, the rust-preventive composition has sufficient corrosion resistance, and is capable of preventing dripping from automotive bodies.

In the rust-preventive composition according to the present aspect, the amount of volatile organic solvent may be not more than 10% by mass. The amount may be preferably not more than 5% by mass. The organic solvent means a compound such as a hydrocarbon (for example, n-hexane), a halogenated hydrocarbon (for example, trihalomethane, trichloroethylene, or tetrachloroethylene), an aromatic hydrocarbon (for example, benzene, toluene, xylene, or trimethylbenzene), or a polycyclic aromatic hydrocarbon (an aromatic compound containing not less than three benzene rings, for example, benzo [a] pyrene), especially a compound harmful to the natural environment or a living body. The amount of the volatile organic solvent can be determined by calculating the mass of organic compound evaporated when the rust-preventive composition is left to stand in an environment at 110° C. for 1 hour, or based on the mass of the non-volatile component. Since the rust-preventive composition also contains water, water may be included in the volatile component. In the rust-preventive composition of the present aspect, the mass of the non-volatile component as determined by leaving the composition to stand in an environment at 110° C. for 1 hour is preferably not less than 95% by mass, more preferably not less than 97% by mass.

The rust-preventive composition of the present aspect is capable of suppressing dripping even when it is applied to form a thick film, and even in an environment at a temperature of as high as not less than the melting point of the wax contained. By the rust-preventive composition of the present aspect, a rust-preventive film having a film thickness of not less than 200 μm, especially not less than 300 μm, still especially not less than 400 μm can be formed on an automotive part or the like. The film thickness of the rust-preventive film formed by the rust-preventive composition is the film thickness of the stable film formed after application of the rust-preventive composition. Thus, the rust-preventive composition of the present invention is especially suitable for uses in which a rust-preventive film having a film thickness of not less than 200 μm is formed on an automotive part or the like composed of a steel material or the like. Further, even for plate joining parts to which a rust-preventive property can be hardly imparted, use of the rust-preventive composition of the present aspect enables imparting of a high rust-preventive property.

Thus, an automotive part having a rust-preventive film comprising the rust-preventive composition is also one aspect of the present invention.

Examples

The present invention is described below in more detail using Examples. However, the scope of the present invention is not limited by these Examples.

<Preparation of Rust-Preventive Composition>

The raw materials shown in Table 1 (% by mass) were mixed with a commercially available rust-preventive additive, and the resulting mixture was heated and stirred. Thereafter, the mixture was naturally cooled to obtain each of the rust-preventive compositions of Examples 1 to 11 and Comparative Examples 1 to 4. The codes in Table 1 represent the following raw materials used for the preparation of the rust-preventive compositions. As a hydrogenated oil, a dehydrated polymerized castor oil was used. As a filler, calcium carbonate was used.

(B1) Microcrystalline wax (B2) Ethylene-propylene copolymer (E1) Mineral oil-based lubricating oil (kinematic viscosity at 40° C., 20 mm$^2$/s)

(E2) Mineral oil-based lubricating oil (kinematic viscosity at 40° C., 10 mm$^2$/s)

(E3) Mineral oil-based lubricating oil (kinematic viscosity at 40° C., 30 mm$^2$/s)

(E4) Mineral oil-based lubricating oil (kinematic viscosity at 40° C., 100 mm$^2$/s)

(E5) Mineral oil-based lubricating oil (kinematic viscosity at 40° C., 220 mm$^2$/s)

TABLE 1

| | Wax | Bentonite | Hydro-genated Oil | Diluents | Filler |
|---|---|---|---|---|---|
| Example 1 | (B2) 3 | 3 | 10 | (E1)20, (E4)30 | 10 |
| Example 2 | (B2) 5 | 4 | 15 | (E1)33, (E4)9 | 5 |
| Example 3 | (B2) 4 | 4 | 10 | (E1)33, (E4)22 | 7 |
| Example 4 | (B2) 3 | 2 | 10 | (E1)20, (E4)20 | 6 |
| Example 5 | (B2) 3 | 3 | 10 | (E1)30, (E4)10, (E5)10 | 9 |
| Example 6 | (B1) 7 | 6 | 13 | (E1)35, (E4)12 | 15 |
| Example 7 | (B1) 10 | 3 | 10 | (E1)40, (E4)14 | 5 |
| Example 8 | (B1) 13 | 3 | 10 | (E1)40, (E4)11 | 5 |
| Example 9 | (B2) 4 | 5 | 10 | (E1)42, (E4)12 | 11 |
| Example 10 | (B2) 4 | 5 | 10 | (E2)42, (E4)12 | 11 |
| Example 11 | (B2) 4 | 5 | 10 | (E3)42, (E4)12 | 11 |
| Comparative Example 1 | (B2) 5 | 4 | 15 | (E1)31 | 10 |
| Comparative Example 2 | (B2) 5 | 4 | 15 | (E4)31 | 10 |

TABLE 1-continued

| | Wax | Bentonite | Hydro-genated Oil | Diluents | Filler |
|---|---|---|---|---|---|
| Comparative Example 3 | (B2) 5 | 4 | 15 | (E5)31 | 10 |
| Comparative Example 4 | (B1) 10 | 1 | 10 | (E4)64 | 5 |

<Evaluation of Rust-Preventive Performance>

To a cold-rolled steel plate (JIS G 3141 SPCC-SD) of 70×150×0.8 mm after oil component removal using a solvent (mineral spirit) and drying, the rust-preventive composition of each of Examples 1 to 11 and Comparative Examples 1 to 4 was applied using a bar coater to a film thickness of 50 μm. After drying at room temperature for 72 hours, a neutral salt spray test was carried out for up to 720 hours to measure the time required for generation of rust. Thereafter, the rust-preventive performance was evaluated according to the following evaluation criteria. The results are shown in Table 2. The rust-preventive performance was judged as acceptable when it was rated as "A" or a higher rate.

S: No rust generation for 720 hours

A: Not less than 480 hours and less than 720 hours

B: Not less than 240 hours and less than 480 hours

<Evaluation of Rust-Preventive Performance for Inside of Joining Surface >

An alloyed hot-dip galvanized steel plate of 70 (width)× 150 (length)×0.8 mm (hereinafter referred to as steel plate A) and an alloyed hot-dip galvanized steel plate of 40 (width)×70 (length)×0.8 mm (hereinafter referred to as steel plate B) were provided. The steel plate B was layered on the steel plate A such that the steel plate B was positioned 60 mm distant from the upper end and 20 mm distant from the lower end of the steel plate A in the longitudinal direction, and at the center in the transverse direction. In this state, spot welding was carried out at two positions located at the center in the transverse direction, and 23 mm and 46 mm distant from the upper end of the steel plate B. The gap in the joining part was adjusted to 200 to 300 μm, and this test piece, in the state where the plates are joined together, was subjected to electrodeposition coating (using the electrodeposition paint PN1010 manufactured by Nippon Paint Co., Ltd.), to provide a test piece for testing rust prevention for the inside of the joining part.

Each of the rust-preventive compositions of Examples 1 to 11 and Comparative Examples 1 to 4 was applied by spraying to the plate joining surface of the test piece for rust prevention testing, to a film thickness of 100 μm. The test piece was then subjected to a cycle test using a combined cycle tester, wherein in each repeated cycle, the test piece was subjected to 4 hours of a neutral salt spray test, 5 hours of forced drying at 70° C., 12 hours of a humidity cabinet test, 2 hours of forced drying at 70° C., and 1 hour of natural drying. After the test, the welded joining part was detached to determine the number of cycles required for generation of rust in the joining part. Thereafter, the rust-preventive performance for the inside of the joining surface was evaluated according to the following evaluation criteria. The results are shown in Table 2. The performance was judged as acceptable when it was rated as "A" or a higher rate.

S: No generation of rust for not less than 90 cycles

A: Not less than 60 cycles and less than 90 cycles

B: Not less than 30 cycles and less than 60 cycles

C: Less than 30 cycles

7

<Evaluation of Film Retentivity>

Electrodeposition-coated plates (manufactured by Paltec Co., Ltd.) of 70×150×0.8 mm were provided. After removal of the oil component of each plate using a solvent (mineral spirit), the plate was dried, and the lower half of the test piece was masked, followed by application of a rust-preventive composition sample to the upper half using a bar coater. Coated plates were prepared while increasing the film thickness in 100-μm steps from a minimum film thickness of 500 μm to a maximum film thickness of 800 μm. Thereafter, each plate was naturally dried for 4 hours in a position horizontal to the ground. Thereafter, the masking was peeled off, and the plate was heated at 80° C. for 30 minutes in a position vertical to the ground, to investigate the film thickness at which dripping occurred. Thereafter, the film retentivity was evaluated according to the following evaluation criteria. The results are shown in Table 2. The film retentivity was judged as acceptable when it was rated as "A" or a higher rate.

S: No occurrence of dripping at 800 μm
A: Not less than 700 μm and less than 800 μm
B: Not less than 600 μm and less than 700 μm
C: Less than 600 μm <Evaluation of Leaching Property>

Two electrodeposition-coated plates (manufactured by Paltec Co., Ltd.) of 70×150×0.8 mm after oil component removal using a solvent (mineral spirit) and drying were layered on each other, and part (70×30 mm) of one of the electrodeposition-coated plates was bent at an angle of 30°. Thereafter, the plates were fixed using a clip to prepare a test material for evaluation of the leaching property. The test material was placed in a position vertical to the ground (such that the non-layered portion was placed in the upper side), and 24 μl of the rust-preventive composition of each of the Examples and the Comparative Examples was injected using a microsyringe from the top into the layered portion of the two electrodeposition-coated plates, followed by leaving the test material to stand at 20° C. for 48 hours. Thereafter, the jig was disassembled, and the leaching length was measured to evaluate the leaching property according to the following evaluation criteria. The results are shown in Table 2. The leaching property was judged as acceptable when it was rated as "A" or a higher rate.

S: Not less than 25 mm
A: Not less than 20 mm and less than 25 mm
B: Not less than 15 mm and less than 20 mm
C: Less than 15 mm

TABLE 2

| | Rust-Preventive Performance | Rust-Preventive Performance for Inside of Joining Surface | Film Retentivity | Leaching Property |
|---|---|---|---|---|
| Example 1 | S | A | A | A |
| Example 2 | S | A | S | A |
| Example 3 | S | S | S | S |
| Example 4 | S | A | S | A |
| Example 5 | S | S | S | S |

8

TABLE 2-continued

| | Rust-Preventive Performance | Rust-Preventive Performance for Inside of Joining Surface | Film Retentivity | Leaching Property |
|---|---|---|---|---|
| Example 6 | A | A | S | S |
| Example 7 | S | S | A | S |
| Example 8 | S | A | S | A |
| Example 9 | A | S | S | S |
| Example 10 | A | S | A | S |
| Example 11 | A | A | S | A |
| Comparative Example 1 | S | B | A | B |
| Comparative Example 2 | S | B | S | C |
| Comparative Example 3 | S | C | A | C |
| Comparative Example 4 | B | A | C | S |

Although the present invention is described in detail with reference to concrete examples, it is evident to those skilled in the art that various changes and modifications may be made without departing from the spirit and scope of the present invention.

The invention claimed is:

1. A rust-preventive composition comprising: a rust-preventive additive; a wax having a melting point within a range of 60° C. to 130° C. selected from microcrystalline waxes and polyethylene-based or polypropylene-based synthetic waxes; bentonite; a hydrogenated oil; and two or more kinds of diluents having different viscosities; the rust-preventive additive being contained in an amount within a range of 12% by mass to 39% by mass with respect to the total composition, the bentonite being contained in an amount within a range of 2% by mass to 6% by mass with respect to the total composition, and the wax being contained in an amount within a range of 3% by mass to 13% by mass with respect to the total composition, wherein a diluent having a lowest viscosity among the two or more kinds of diluents having different viscosities is contained in an amount within a range of 40% by mass to 80% by mass with respect to the total amount of diluents, and the diluent having the lowest viscosity among the two or more kinds of diluents having different viscosities has a kinematic viscosity within a range of 10 mm$^2$/s to 30 mm$^2$/s at 40° C., and wherein a diluent having a highest viscosity among the two or more kinds of diluents has a kinematic viscosity of 50 mm$^2$/s or more.

2. The rust preventive composition according to claim 1, wherein the two or more kinds of diluents having different viscosities are contained in an amount within a range of 33% by mass to 60% by mass with respect to the total composition.

3. An automotive part having a rust-preventive film comprising the rust-preventive composition according to claim 1.

* * * * *